July 6, 1937.   W. E. WUNDERLICH   2,086,012
SPRING STRUCTURE
Filed Nov. 24, 1934
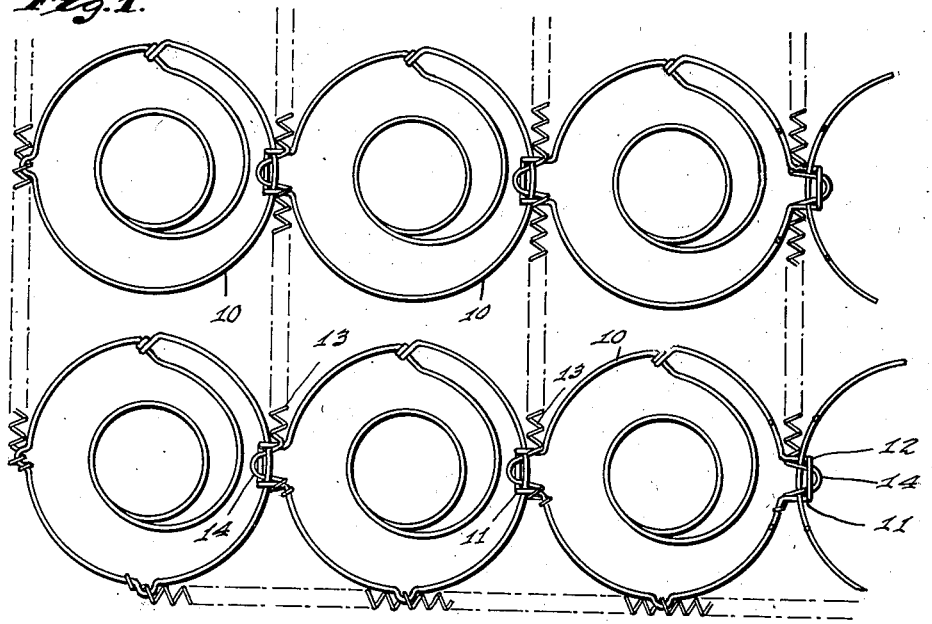
Fig. 1.
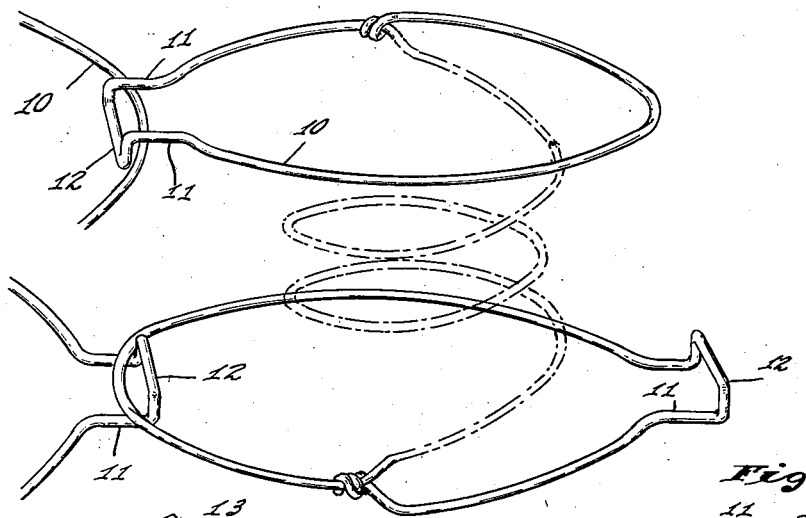
Fig. 2.
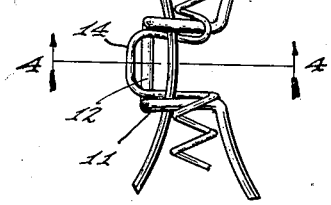
Fig. 5.
Fig. 4.
Inventor
WILLIAM E. WUNDERLICH,
By
Attorney.

Patented July 6, 1937

2,086,012

UNITED STATES PATENT OFFICE 2,086,012

SPRING STRUCTURE

William E. Wunderlich, Muncie, Ind.

Application November 24, 1934, Serial No. 754,553

1 Claim. (Cl. 5—269)

This invention relates to spring assemblies of the type used in upholstery, mattresses, or in bed springs. Such an assembly comprises a plurality of rows of open-wound compression springs and means for holding such springs in proper relation. In one common form of spring assembly, the compression springs are held together by relatively small helical springs which extend for the length of the assembly and embrace offsets on the end turns of the compression springs. This method of holding the compression springs together is satisfactory in the main, but is open to the objection that the small-diameter helical springs must be threaded around the abutting offsets of the compression springs for the full length of the spring assembly.

It is the object of my invention to produce a spring assembly in general of the type above described, but to eliminate the necessity for threading the helical springs around the offsets on the end turns of the compression springs. A further object of my invention is to so arrange the offsets and the helical springs as to prevent the possibility that any of the interconnected parts will snap past each other with accompanying noise when the spring-assembly is loaded.

In carrying out my invention, I provide the end turns of the compression springs with U-shaped offsets each of which projects radially outward from its end turn and has its outer end bent perpendicularly to the plane of the end turn. In assembling, the offset of one spring is laid over the end turn of the adjacent spring, and the helical locating spring is then laid over the offset. At the offset, the wire forming the helical locating spring is distorted to form a laterally projecting tongue which is inserted between the intermediate portion of the offset and the end turn of the adjacent spring which such offset overlaps.

The accompanying drawing illustrates my invention: Fig. 1 is a fragmental plan view illustrating one corner of a spring assembly; Fig. 2 is a perspective view of an enlarged scale showing two of the compression springs arranged ready for the application of the helical locating springs which will hold them together; Fig. 3 is a fragmental plan view on an enlarged scale similar to Fig. 1; and Fig. 4 is a vertical section on the line 4—4 of Fig. 3.

The spring assembly is composed of a plurality of spaced rows of open-wound compression springs 10, which usually are of hour-glass form with plane end turns. Where the spring-asssembly is used in a bed-spring, the lower ends of the springs 10 are usually secured to a suitable frame in well known manner, and the expedient forming the subject matter of this application is employed only at the upper face of the assembly to hold the upper ends of the springs 10 in proper relation; but where the spring assembly is used in a mattress or in upholstery there may be no frame, and in that case the same expedient for holding the springs 10 together may be employed at both faces of the assembly. The drawing illustrates and I shall specifically describe herein the latter type of assembly; but it will be understood that my invention is not limited thereto.

At each point where, in each row, the end turns of adjacent springs 10 approach each other, one of such end turns is provided with a coplanar outwardly projecting offset 11 of a general U-shape. The outer portion of the offset 11 is bent to extend generally perpendicularly to the plane of the end turn, as indicated at 12 in Figs. 2 and 4. If the same expedient for holding the springs together is to be used on both the upper and lower faces of the assembly, the offset 11 on one end turn of each spring is preferably located diametrically opposite the offset on the other end turn of such spring, as is clear from Fig. 2.

In the finished assembly, adjacent springs 10 in each row occupy the relative position indicated in Fig. 2, with each offset 11 overlapping the associated end turn of the adjacent spring 10 and with the in-bent end 12 of the offset extending axially inwardly through the end turn of such adjacent spring. The several rows of springs 10, in the assembly shown in the drawing, are parallel and spaced apart, the rows being held in spaced relation and the springs 10 in each row together by helical locating springs 13 extending transversely of the rows and crossing the rows at the offsets 11. The springs 13 are provided, at each offset 11, with a laterally extending tongue 14 which passes axially inward between the two parallel legs of the offset 11, beneath the end turn of the adjacent spring 10, and above and beyond the in-bent end 12 of the offset 11, as is clear from Figs. 3 and 4.

The parts are so proportioned that no displacement of the springs 10 which occurs with ordinary use of the assembly will permit the tongue 14 to be displaced from its normal position between the in-bent end 12 of the offset 11 and the end turn of the adjacent compression spring. That is, there is insufficient space between the end turns of the adjacent springs 10 to permit the helical springs 13 to move to the right in Figs. 3 and 4 sufficiently to effect withdrawal of the tongue 14 from its locking position. Each tongue 14, therefore, acts to lock or key together the end turns of the springs 10 with which it is associated.

By angular displacement of the end turns of the adjacent springs more severe than any occurring in ordinary use of the assembly and by some distortion of the spring 13 and tongue 14, the tongue can be put in its locking position during assembly; and when it is so placed; it will not become accidentally withdrawn. The tongues 14 are preferably formed as indicated in Figs. 3 and 4 and extend diametrically across the spring 13 to provide a greater effective tongue-length. At the point where it crosses beneath the end turn 12 of the adjacent spring, each tongue may be provided with a bend, shown in Fig. 4, to enable it to pass above the portion 12 of the offset 11.

I claim as my invention:

In a spring assembly, a plurality of rows of compression springs and a plurality of helical springs extending transversely of said rows, the end turns of adjacent compression springs in each row being disposed closely adjacent opposite sides of one of said helical springs and approximately coplanar therewith, one of such end turns being provided with an outwardly projecting offset-portion extending across the intervening helical spring and overlapping the other, the material of which said helical springs is formed being deformed at each said offset portion to provide a tongue which projects laterally from the helical spring and between the overlapping portions of the end turns of adjacent compression springs to hold such end turns together.

WILLIAM E. WUNDERLICH.